March 12, 1957  T. NG  2,784,953
MEANS FOR CONTACTING FLUIDS
Filed Oct. 2, 1953

INVENTOR
THOMAS NG
BY *George J. Silkery*
ATTORNEY

United States Patent Office 2,784,953
Patented Mar. 12, 1957

2,784,953
MEANS FOR CONTACTING FLUIDS

Thomas Ng, Elizabeth, N. J., assignor to Esso Research and Engineering Company, a corporation of Delaware Application October 2, 1953, Serial No. 383,740

1 Claim. (Cl. 261—114)

This invention relates to an improved means for contacting fluids in a tower and more particularily to a contacting tray for use in this type of tower, and still more particularly to contacting elements of such a contacting tray.

The contacting of fluids such as liquid and vapor in towers or columns in which there are a series of vertically arranged trays is well known in the art. Such trays are provided with contacting elements for the intimate contacting of the liquid and vapor. In such towers or columns the liquid and vapor streams flow countercurrent to each other such that the vapor flows upwardly through the tower and the liquid flows downwardly through the tower. Liquid enters a particular tray by means of a downcomer or its equivalent from the tray above. The bottom of the downcomer from the tray above lies below the liquid level on the particular tray in order to prevent the passage of vapor up the downcomer to the tray above. The liquid from the downcomer flows transversely across the tray and contacts vapors rising from the tray below by means of the contacting elements of the particular tray. A definite level of liquid is maintained on the tray by means of a weir. Liquid leaving the tray flows over this weir, enters the downcomer associated with the tray and passes to the tray below. Vapor rising from the tray below passes through the contacting elements of the particular tray, contacts the liquid flowing across the tray by means of the contacting elements and then rises to the tray above.

There are many types of such contacting elements known in the art. One such type of contacting element is a bubble cap. In this type of contacting element the vapor rising to a particular tray from the tray below flows through a chimney or its equivalent into a vapor space within the bubble cap and then bubbles through the liquid by means of openings at the bottom of the bubble cap, such that intimate mixing of the vapor and liquid results. The contacting trays in these bubble cap towers contain many such chimneys and bubble caps. Due to the complicated form of the bubble cap contacting elements, bubble cap contacting trays are expensive to construct. In addition, the pressure drop of vapor passing through these contacting elements is relatively high.

In order to reduce the fabrication costs of contacting trays and also to reduce the pressure drop of the vapor passing through the contacting elements of such trays, other trays have been developed which include a number of punched or stamped openings in the contacting trays which serve as the contacting elements. These punched openings are produced by making a series of U cuts in the tray and raising the U portion to create tongues or tabs. Although this design has simplified the fabrication of contacting trays and also has reduced the pressure drop across such trays to some extent, these trays exhibit certain disadvantages. For example, the rigidity of such tongues or tabs is very low as they are supported on only one side. For this reason, when installing such trays in a tower or removing them for cleaning or repairing, the tabs or tongues are often bent up or down, which results in a decreased efficiency of such trays. Also, it is necessary to punch many such openings in a tray in order to attain efficient contacting and adequate capacity. The present invention is designed to overcome the aforementioned disadvantages of contacting trays.

An object of the present invention is to provide a contacting tray wtih contacting elements which are characterized by a high degree of rigidity in addition to simplicity of construction.

A further object of the present invention is to provide a highly efficient means for intimately contacting vapor and liquid in a tower while at the same time subjecting the vapor passing through the tower to a minimum pressure drop.

The construction of contacting trays made in accordance with the present invention is shown in the accompanying drawings forming a part of the specification wherein—

Figure 1:
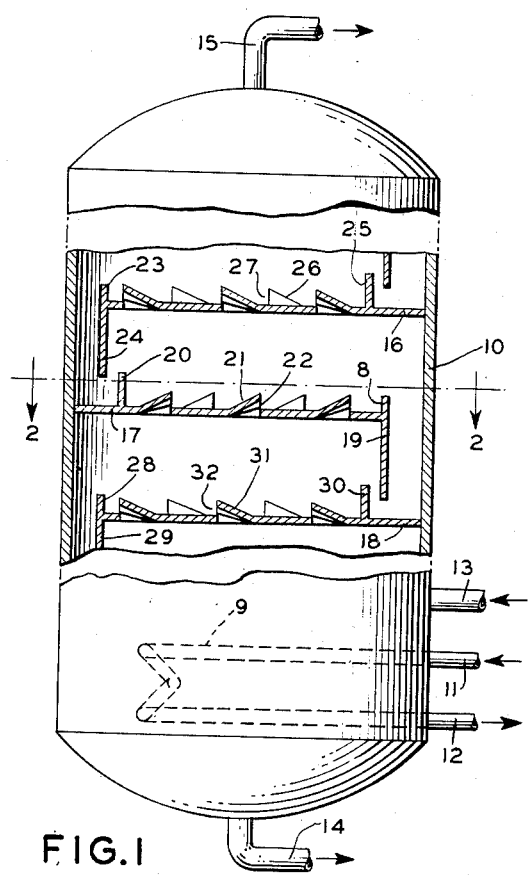
Fig. 1 represents a tower containing contacting trays made in accordance with the present invention, with a part of the tower shown in vertical cross section to facilitate the disclosure.

Referring now to Fig. 1, reference character 10 designates a contacting tower such as one commonly employed for the separation of hydrocarbons by fractionation. It is to be understood, however, that the present invention is not limited to this process only, but is applicable to other processes such as chemical reactions and other types of separation wherein vapor and liquid are contacted in a countercurrent zone. Tower 10 is provided with a line 11 for introducing a heating medium into heating coil 9, if such heating medium is required, and a line 12 for removing such heating medium from heating coil 9. An inlet line 13 is provided for introducing a feed stock to the lower portion of tower 10. Such feed stock may be preheated prior to its introduction to tower 10. Tower 10 is also provided with product lines 14 and 15, with the lower boiling products in the form of vapor leaving tower 10 through line 15 and the higher boiling products in the form of liquid leaving tower 10 through line 14. Tower 10 may be provided with other product lines connecting to and communicating with the side of tower 10, if such products are desired. The size of tower 10 will depend upon the capacity, degree of fractionation, etc., required for the particular operation.

A cross sectional view of the center section of tower 10 is shown to illustrate the operation of the present invention. Three contacting trays designated by reference characters 16, 17 and 18 are shown. Each tray has a plurality of contacting elements and is combined with an inlet weir, an outlet weir, and a downcomer to form a contacting unit. Thus, tray 16 has a plurality of contacting elements, such as contacting element 26, and is combined with inlet weir 25, outlet weir 23 and downcomer 24; tray 17 has a plurality of contacting elements, such as contacting element 21, and is combined with inlet weir 20, outlet weir 8 and downcomer 19; and tray 18 has a plurality of contacting elements, such as contacting element 31, and is combined with inlet weir 30, outlet weir 28 and downcomer 29. In certain contacting processes the inlet weirs are not required.

In the operation of tower 10, liquid is introduced to tray 16 by means of the downcomer from the tray above tray 16. The liquid flows over inlet weir 25 onto tray 16 and flows transversely to the left in Fig. 1 across tray 16. The liquid in moving across tray 16 flows over the contacting elements of tray 16, such as contacting element 26, and contacts vapor which is rising from tray 17. The vapor passes through openings in tray 16 such as opening 27 of contacting element 26. The liquid on tray 16 is maintained at a definite level by means of outlet weir 23. The liquid leaves tray 16 by flowing over outlet weir 23 into downcomer 24 to tray 17 below. It will be noted that the liquid on successive trays flows in opposite directions. Thus the liquid enters tray 17 by flowing over inlet weir 20, flows to the right in Fig. 1 across tray 17 and over outlet weir 8 and falls through downcomer 19 to tray 18. The liquid then flows over inlet weir 30, across tray 18 to the left in Fig. 1 and over outlet weir 28 and falls through downcomer 29 to the tray below tray 18. The flow of liquid across other trays in the tower is similar to the flow across trays 16, 17 and 18.

The flow of vapor in tower 10 is countercurrent to the flow of the liquid. The vapor passes upwardly in tower 10 through tray 18 by means of openings, such as opening 32 of contacting element 31, then rises to tray 17 and passes through openings, such as opening 22 of contacting element 21, and then rises upwardly to tray 16 and passes through openings such as opening 27 of contacting element 26. The flow of vapors through other trays of tower 10 is similar to that just described for trays 16, 17 and 18. It will be noted that it is necessary for the vapor to flow through the liquid stream on each tray in order to pass through the openings of the contacting elements to the space above the tray. In this way intimate contacting of the liquid and vapor to effect the separation or chemical reaction is accomplished. For example, during this intimate contacting, lower boiling components of the liquid are vaporized and higher boiling components of the vapor are condensed when fractionating hydrocarbons.

Figure 2:
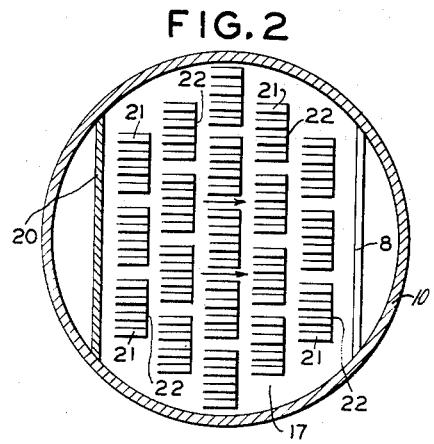
Fig. 2 represents a diagrammatic horizontal sectional view of the tower taken substantially on line 2—2 of Fig. 1 illustrating the arrangement of contacting elements on the contacting tray.

In Fig. 2, the flow of liquid across tray 17 is indicated by the arrows shown in the diagram. A number of contacting elements, such as contacting element 21, are shown in one possible arrangement. It will be noted in this arrangement that the openings of all contacting elements are located on only the downstream side of the contacting elements so that the vapor passing out of such openings aids in pushing the liquid across the tray. In this way liquid holdup on the tray is reduced to thereby increase the capacity of tower 10. The contacting elements are arranged in rows perpendicular to the line of flow of the liquid and are staggered to prevent channeling of the liquid. It is to be understood that the present invention is not restricted to this particular arrangement, nor number of contacting elements, as the utilization of more rows, or more contacting elements is within the spirit of the present invention.

Figure 3:
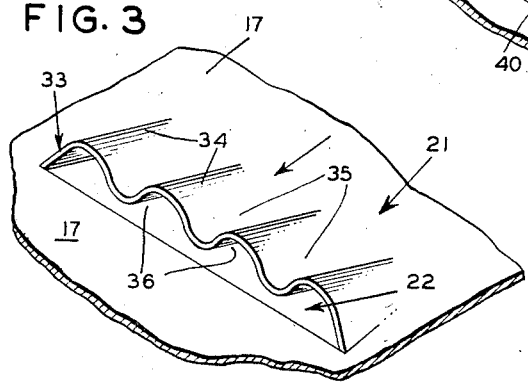
Fig. 3 is a detailed perspective view of one form of the contacting elements.

A detailed perspective view of contacting element 21 is shown in Fig. 3. This form of contacting element is produced from the metal body of the contacting tray by a simple stamping, pressing or punching operation. Because of this, the cost of fabricating this contacting element is considerably lower than the cost of fabricating, for example, a bubble cap contacting element. In this form of the present invention contacting element 21 is formed by a single stamping operation in which a straight linear slit is first cut in contacting tray 17 and then lip 33 is forced away from the plane of contacting tray 17. Lip 33 of contacting element 21 is pressed into a wave-like or corrugated form consisting of a plurality of alternate ridges and grooves, such as ridges 34 and grooves 35. Contacting element 21 is characterized by a single primary opening 22 comprising a plurality of secondary openings, such as secondary openings 36, which are formed by the ridges and grooves. The projections of the ridges upon the plane of contacting tray 17 are substantially perpendicular to the slit cut in contacting tray 17 during the stamping operation and the ridges diminish in size from opening 22 toward the back edge of contacting element 21. Lip 33 is raised from the plane of contacting tray 17 at an angle in the direction of the opening and is integral on three sides with the body of contacting tray 17. The liquid flows in the direction indicated by the arrow up the gradually rising corrugated lip 33 of contacting element 21 and contacts the vapor passing through opening 22.

The effect of this form of construction is to increase the effective openings in the contacting tray, and in this way provide more efficient contacting of vapor and liquid in addition to subjecting the vapor passing through the contacting element to a minimum pressure drop. Also, contacting element 21 exhibits a high degree of rigidity, because lip 33 of contacting element 21 of the present invention is supported not only at the back but also on the sides. In addition, the corrugated form of lip 33 increases the rigidity of contacting element 21. The rigidity of contacting element 21 may be further increased by welding one or more of grooves 35 of lip 33 to tray 17.

Figure 4:
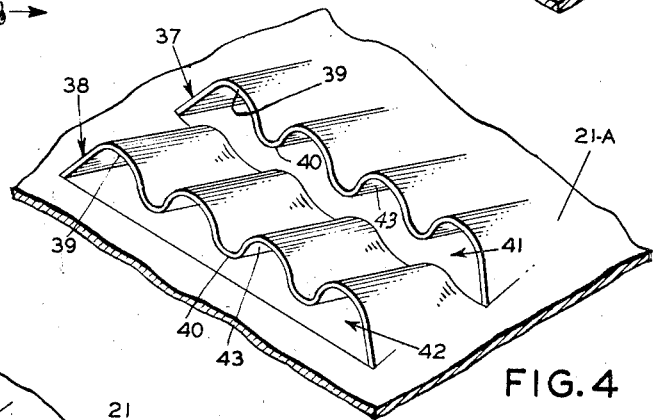
Fig. 4 is a detailed perspective view of a modification of the contacting elements.

A modification of the contacting element of the present invention is illustrated in Fig. 4 and is designated by reference character 21–A. In this form of the invention contacting element 21–A is made up of a pair of two lips including a first lip 37 and a second lip 38. Contacting element 21–A is formed by a single stamping operation in which two parallel straight linear slits are first cut in the contacting tray and then lips 37 and 38 are forced away from the plane of the contacting tray. A primary opening 41 is formed between the adjacent edges of lips 37 and 38. Another primary opening 42 is formed between lip 38 and the contacting tray. Lips 37 and 38 are pressed into a wave-like or corrugated form having alternate ridges and grooves such as ridges 39 and grooves 40. These ridges and grooves provide primary openings 41 and 42 with a plurality of secondary openings such as secondary openings 43. Lip 37 is raised from the contacting tray in the direction of primary opening 41 and is integral with the contacting tray at its back edge as well as the sides. Lip 38 is raised at an angle from the plane of the contacting tray in the direction of primary opening 42 and is integral with the contacting tray at two sides. The edge of lip 37 that is adjacent to lip 38 is raised above the edge of lip 38 that is adjacent to lip 37. The liquid passing across the contacting tray thus flows over lip 37 and contacts vapor rising through primary opening 41 between lip 37 and lip 38 and then flows across lip 38 and contacts vapors passing through primary opening 42 between lip 38 and the contacting tray. A contacting element having more than two lips could be formed in a manner similar to contacting element 21–A.

Figure 5:
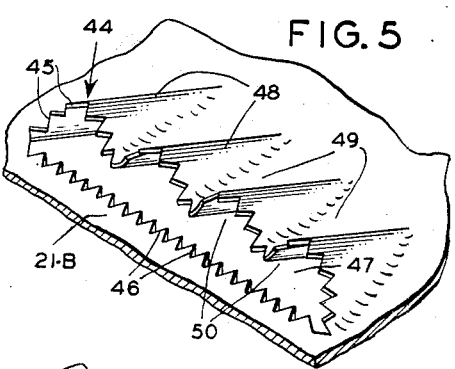
Fig. 5 is a detailed perspective view of another modification of the contacting elements.

Another modification of the contacting element of the present invention is shown in Fig. 5 and is designated by the reference character 21–B. This form of contacting element is constructed by initially making a serrated cut in the contacting tray and then pressing a portion of the contacting tray upwards to form lip 44. The serrated cut made when constructing contacting element 21–B produces teeth, such as teeth 45 of lip 44 and teeth 46 of the contacting tray. These teeth create additional turbulence to provide more efficient contacting of the liquid and vapor. When lip 44 is raised from the plane of the contacting tray primary opening 47 is formed between lip 44 and the contacting tray. Lip 44 is pressed into a corrugated form consisting of a plurality of ridges and grooves such as ridges 48 and grooves 49. The ridges and grooves form a plurality of secondary openings, such as secondary opening 50, from primary opening 47. Lip 44 is raised at an angle from the contacting tray in the direction of primary opening 47. The ridges of lip 44 decrease in size from primary opening 47 to the back of contacting element 21–B and their projections upon the plane of the contacting tray are substantially perpendicular to the serrated cut initially made in the contacting tray. The liquid flows across the tray and over lip 44 where it contacts vapor passing through secondary openings 50 of primary opening 47.

It is to be understood that it is possible to make other modifications of the present invention without departing from the spirit thereof. The present invention incorporates simplicity and rigidity of construction with high capacity, efficient contacting of liquid and vapor and minimum pressure drop of the vapor passing through the tower. This is accomplished by a contacting element which is corrugated and which is integral on at least two sides with the contacting tray and in addition has a large primary opening for the flow of vapor. Although the contacting elements shown in Figs. 3–5 illustrate a particular number of effective secondary openings formed by the ridges and grooves, it is to be understood that the present invention is not limited to this particular number of secondary openings. The number and length of these openings are limited only by the structural strength of the material used in the construction of the contacting tray and the length of the tray sections.

What is claimed is:

In an apparatus for contacting vapor with liquid, in which said liquid flows in one direction across a substantially horizontal contacting tray, a contacting tray having a plurality of spaced contacting elements, each of said contacting elements comprising at least two corrugated lips extending transversely to the direction of flow of liquid across said tray, the first lip having an edge raised from said contacting tray along a first of a pair of spaced parallel slits and raised from the plane of the tray at an angle in the direction of liquid flow across said tray, the lip thereby defining with the tray an elongated opening for passage of vapors therethrough, said contacting elements also including a second corrugated lip extending between said first slit and a second slit and being also raised at an angle from the plane of the tray in the direction of liquid flow across said tray, the edge of said second lip adjacent the first slit being less elevated above the plane of the tray than the said edge of the first lip and the corrugations of said second lip being aligned with the corrugations of the first lip, thereby providing a first passageway between the two lips and a second passageway between the second lip and the tray.

References Cited in the file of this patent

UNITED STATES PATENTS

| | | |
|---|---|---|
| Re. 11,430 | Vanorman | July 10, 1894 |
| 829,700 | Drees | Aug. 28, 1906 |
| 1,069,335 | Johnson | Aug. 5, 1913 |
| 2,568,749 | Kittel | Sept. 25, 1951 |

FOREIGN PATENTS

| | | |
|---|---|---|
| 669,862 | Great Britain | Apr. 9, 1952 |
| 1,048,712 | France | Aug. 5, 1953 |